United States Patent [19]

Campbell, Jr.

[11] Patent Number: 4,605,820

[45] Date of Patent: Aug. 12, 1986

[54] KEY MANAGEMENT SYSTEM FOR ON-LINE COMMUNICATION

[75] Inventor: Carl M. Campbell, Jr., Newtown Square, Pa.

[73] Assignee: VISA U.S.A. Inc., San Mateo, Calif.

[21] Appl. No.: 550,885

[22] Filed: Nov. 10, 1983

[51] Int. Cl.[4] .................................................. H04L 9/00
[52] U.S. Cl. ................................ 178/22.09; 178/22.08; 178/22.16
[58] Field of Search ............... 178/22.07, 22.09, 22.13, 178/22.14, 22.15, 22.16, 22.19, 22.08; 340/825.34

[56] References Cited

U.S. PATENT DOCUMENTS

| | | | |
|---|---|---|---|
| Re. 30,957 | 6/1982 | Feistel | 178/22.19 |
| 4,370,519 | 1/1983 | McArdle | 178/22.14 |
| 4,408,093 | 10/1983 | Place | 178/22.19 |

OTHER PUBLICATIONS

IBM Technical Disclosure, "Prevention of Unauthorized Use of a Credit Card", by C. A. Gaston, vol. 13, #7, 12/70.

*Primary Examiner*—Salvatore Cangialosi
*Assistant Examiner*—Aaron J. Lewis
*Attorney, Agent, or Firm*—Limbach, Limbach & Sutton

[57] ABSTRACT

The subject invention relates to a new and improved key management system particularly suited to facilitate communication between point of sale terminals and a host processor. The system provides for the generation of a table of keys in the terminal. The terminal includes a counter which is related to the table of keys. During a transaction, information, such as a personal identification number (PIN) is encrypted using one of the keys in the table. This information is transmitted, along with other transaction data, and the number stored in the counter. By utilizing the information in the counter, the host processor can generate the key used for encrypting the PIN. By this arrangement, security is enhanced and there is no need for large storage of keys at the central host.

13 Claims, 16 Drawing Figures

PRIMARY KEY STORAGE AREAS

BASE GENERATOR VALUE (32 HEX DIGITS)

```
┌─────────────┐
│  32 DIGITS  │
└─────────────┘
```

CURRENT GENERATOR VALUE

```
┌─────────────┐      ┌──────────────────────┐
│  32 DIGITS  │      │   MODIFIER TABLE:    │
└─────────────┘      │   FIXED (IN PROM)    │
  32 DIGITS          └──────────────────────┘
                      10 VALUES, 32 DIGITS PER VALUE
```

PRIMARY KEY TABLE:

| COLUMN → | 1 | 2 | 3 | 4 | 5 |
|---|---|---|---|---|---|
| ROW: 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |

32 DIGITS PER ENTRY (50 ENTRIES)

```
            DIGIT #  1 2    3 4 5 6 7    8
                    ┌──────┬──────────┬────────┐
KEY COUNTER         │2 DIGITS│ 5 DIGITS │1 DIGIT│
                    └──────┴──────────┴────────┘
```

PRIMARY KEY STORAGE AREAS

FIGURE 1

BASE GENERATOR VALUE (32 HEX DIGITS)

```
┌─────────────────┐
│    42F9...      │ ◄─── EXTERNALLY LOADED
└─────────────────┘
```

CURRENT GENERATOR VALUE

```
┌─────────────────┐       ┌─────────────────────┐
│                 │       │   MODIFIER TABLE:   │
│                 │       │   FIXED (IN PROM)   │
└─────────────────┘       └─────────────────────┘
    32 DIGITS              10 VALUES, 32 DIGITS PER VALUE
```

PRIMARY KEY TABLE:

| COLUMN → | 1 | 2 | 3 | 4 | 5 |
|---|---|---|---|---|---|
| ROW: 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |

32 DIGITS PER ENTRY (50 ENTRIES)

```
DIGIT #    1  2    3 4 5 6 7    8
         ┌─────┬───────────┬──────┐
KEY      │ 0 0 │ 0 0 0 1 0 │  0   │ ◄── CLEARED
COUNTER  └─────┴───────────┴──────┘
        2 DIGITS  5 DIGITS   1 DIGIT
```

INITIALIZATION OF KEY DATA

FIGURE 2

BASE GENERATOR VALUE (32 HEX DIGITS)

```
┌─────────────┐
│  REPLACED   │  (REPLACED AS DESCRIBED SUBSEQUENTLY)
└─────────────┘
```

CURRENT GENERATOR VALUE

```
┌─────────────┐         ┌──────────────────────┐
│   42F9...   │         │  MODIFIER TABLE:     │
└─────────────┘         │  FIXED (IN PROM)     │
  32 DIGITS             └──────────────────────┘
                          10 VALUES, 32 DIGITS PER VALUE
```

PRIMARY KEY TABLE:

| COLUMN → ROW: | 1 ↓ | 2 | 3 | 4 | 5 |
|---|---|---|---|---|---|
| 0 | 3B92... | | | | |
| 1 | C03B... | | | | |
| 2 | 24D6... | | | | |
| 3 | 8025... | | | | |
| 4 | 48E7... | | | | |
| 5 | 5CD5... | | | | |
| 6 | 0258... | | | | |
| 7 | 5145... | | | | |
| 8 | 42FD... | | | | |
| 9 | 059B... | | | | |

32 DIGITS PER ENTRY (50 ENTRIES)

```
            DIGIT #  1 2   3 4 5 6 7   8
                    ┌─────┬─────────┬─────┐
KEY COUNTER         │ 0 0 │ 0 0 0 0 0│  0  │
                    └─────┴─────────┴─────┘
                    2 DIGITS  5 DIGITS  1 DIGIT
```

XXXX... = CLEARED

GENERATION OF COLUMN 1 USING LOADED VALUE

FIGURE 3

GENERATION OF AN OUTPUT VALUE

BASE GENERATOR VALUE (32 HEX DIGITS)

| REPLACED |

CURRENT GENERATOR VALUE

| 3B92... |

32 DIGITS

| MODIFIER TABLE: FIXED (IN PROM) |

10 VALUES, 32 DIGITS PER VALUE

PRIMARY KEY TABLE:

| COLUMN → ROW: | 1 | 2 ⌄ | 3 | 4 | 5 |
|---|---|---|---|---|---|
| 0 | XXXX... | 95A8... | | | |
| 1 | C03B... | 0EEC... | | | |
| 2 | 24D6... | 7AD1... | | | |
| 3 | 8025... | D374... | | | |
| 4 | 48E7... | 809F... | | | |
| 5 | 5CD5... | C02F... | | | |
| 6 | 0258... | 4615... | | | |
| 7 | 5145... | 2055... | | | |
| 8 | 42FD... | DF3B... | | | |
| 9 | 059B... | 31FE... | | | |

32 DIGITS PER ENTRY (50 ENTRIES)

DIGIT #   1 2   3 4 5 6 7   8
KEY COUNTER   | 0 0 | 0 0 0 0 0 | 0 |
              2 DIGITS    5 DIGITS    1 DIGIT

XXXX... = CLEARED

GENERATION OF COLUMN 2 USING FIRST VALUE IN COLUMN 1

FIGURE 5

BASE GENERATOR VALUE (32 HEX DIGITS)

```
┌──────────────┐
│   REPLACED   │
└──────────────┘
```

CURRENT GENERATOR VALUE

```
┌──────────────┐          ┌──────────────────────┐
│   95A8...    │          │   MODIFIER TABLE:    │
└──────────────┘          │   FIXED (IN PROM)    │
  32 DIGITS               └──────────────────────┘
                           10 VALUES, 32 DIGITS PER VALUE
```

PRIMARY KEY TABLE:

| COLUMN → | 1 | 2 | 3 ↓ | 4 | 5 |
|---|---|---|---|---|---|
| ROW: | | | | | |
| 0 | XXXX... | XXXX... | 26D5... | | |
| 1 | C03B... | 0EEC... | A94D... | | |
| 2 | 24D6... | 7AD1... | 5926... | | |
| 3 | 8025... | D374... | 6CF3... | | |
| 4 | 48E7... | 809F... | D761... | | |
| 5 | 5CD5... | C02F... | 91FC... | | |
| 6 | 0258... | 4615... | 2F10... | | |
| 7 | 5145... | 2055... | 0858... | | |
| 8 | 42FD... | DF3B... | 90C8... | | |
| 9 | 059B... | 31FE... | 88C9... | | |

32 DIGITS PER ENTRY (50 ENTRIES)

```
       DIGIT #  1 2    3 4 5 6 7   8
KEY COUNTER   ┌──────┬───────────┬───┐
              │ 0 0  │ 0 0 0 0 0 │ 0 │
              └──────┴───────────┴───┘
              2 DIGITS  5 DIGITS  1 DIGIT
```

XXXX... = CLEARED

GENERATION OF COLUMN 3 USING FIRST VALUE IN COLUMN 2

FIGURE 6

BASE GENERATOR VALUE (32 HEX DIGITS)

```
┌─────────────┐
│  REPLACED   │
└─────────────┘
```

CURRENT GENERATOR VALUE

```
┌─────────────┐        ┌──────────────────┐
│ (COL.4 ROW 0)│       │ MODIFIER TABLE:  │
└─────────────┘        │ FIXED (IN PROM)  │
  32 DIGITS            └──────────────────┘
                        10 VALUES, 32 DIGITS PER VALUE
```

PRIMARY KEY TABLE:

| COLUMN → | 1 | 2 | 3 | 4 | 5 ↓ | |
|---|---|---|---|---|---|---|
| ROW: | | | | | | |
| 0 | XXXX... | XXXX... | XXXX... | XXXX... | 11C2... | 796C... |
| 1 | C03B... | 0EEC... | A94D... | XXXX... | D170... | 02D0... |
| 2 | 24D6... | 7AD1... | 5926... | 9D94... | F059... | BEA9... |
| 3 | 8025... | D374... | 6CF3... | 7F80... | 129F... | 0C5F... |
| 4 | 48E7... | 809F... | D761... | F06D... | 02EA... | 3228... |
| 5 | 5CD5... | C02F... | 91FC... | DE92... | 522F... | B942... |
| 6 | 0258... | 4615... | 2F10... | 1287... | DFED... | 4207... |
| 7 | 5145... | 2055... | 0858... | B525... | 92AE... | 8A23... |
| 8 | 42FD... | DF3B... | 90C8... | 50E2... | 8086... | FD54... |
| 9 | 059B... | 31FE... | 88C9... | A01A... | 0B87... | B5C4... |

32 DIGITS PER ENTRY (50 ENTRIES)

COL. 5 SHOWN EXPANDED

```
DIGIT #      1 2    3 4 5 6 7    8
            ┌─────┐┌─────────┐┌─────┐
KEY COUNTER │ 0 0 ││ 0 0 0 0 0 ││ 0   │
            └─────┘└─────────┘└─────┘
            2 DIGITS  5 DIGITS  1 DIGIT
```

XXXX... = CLEARED

GENERATION OF COLUMN 5 USING FIRST VALUE IN COLUMN 4

FIGURE 7

| KEY COUNTER* | KEY |
|---|---|
| 00 00000 0 | 11C2... |
| 00 00000 1 | 796C... |
| 00 00001 0 | D170... |
| 00 00001 1 | C2D0... |
| 00 00002 0 | F059... |
| 00 00002 1 | BEA9... |
| 00 00003 0 | 129F... |
| ⋮ | ⋮ |
| 00 00009 0 | 0B87... |
| 00 00009 1 | B5C4... |
| NEW COLUMN 5 VALUES GENERATED | |
| 00 00010 0 | DD31... |
| 00 00010 1 | D904... |
| ETC. | ETC. |

NOTE: EACH KEY IS ERASED FROM COLUMN 5 IMMEDIATELY AFTER USE

*CORRESPONDING KEY COUNTER VALUE IS TRANSMITTED WITH EACH TRANSACTION. EACH TRANSACTION USES NEXT SUCCESSIVE KEY COUNTER VALUE AND ASSOCIATED KEY.

KEY SELECTION FROM COLUMN 5 FOR PIN ENCRYPTION

FIGURE 8

BASE GENERATOR VALUE (32 HEX DIGITS)

```
┌─────────────┐
│  REPLACED   │
└─────────────┘
```

CURRENT GENERATOR VALUE

```
┌─────────────┐         ┌──────────────────────┐
│   1642...   │         │   MODIFIER TABLE:    │
└─────────────┘         │   FIXED (IN PROM)    │
  32 DIGITS             └──────────────────────┘
                         10 VALUES, 32 DIGITS PER VALUE
```

PRIMARY KEY TABLE:

| COLUMN → | 1 | 2 | 3 | 4 | 5 | |
|---|---|---|---|---|---|---|
| ROW: | | | | | ↓ | |
| 0 | XXXX... | XXXX... | XXXX... | XXXX... | DD31... | D904... |
| 1 | C03B... | 0EEC... | A94D... | XXXX... | CA50... | 1561... |
| 2 | 24D6... | 7AD1... | 5926... | 9D94... | 4F35... | 34EA... |
| 3 | 8025... | D374... | 6CF3... | 7F80... | 6CD8... | 1D4F... |
| 4 | 48E7... | 809F... | D761... | F06D... | 2FB1... | 456B... |
| 5 | 5CD5... | C02F... | 91FC... | DE92... | D771... | 38EF... |
| 6 | 0258... | 4615... | 2F10... | 1287... | AF04... | 512F... |
| 7 | 5145... | 2055... | 0858... | B525... | A5D6... | 7260... |
| 8 | 42FD... | DF3B... | 90C8... | 50E2... | 71BD... | 5A0A... |
| 9 | 059B... | 31FE... | 88C9... | A01A... | 37C3... | DD95... |

32 DIGITS PER ENTRY (50 ENTRIES)     COL. 5 SHOWN EXPANDED

```
              DIGIT #  1 2   3 4 5 6 7    8
                      ┌─────┐┌─────────┐┌───┐
  KEY COUNTER         │ 0 0 ││ 0 0 0 1 0││ 0 │
                      └─────┘└─────────┘└───┘
                      2 DIGITS  5 DIGITS  1 DIGIT
```

XXXX... = CLEARED

GENERATION OF NEW COLUMN 5 VALUES USING SECOND
VALUE IN COLUMN 4

FIGURE 9

BASE GENERATOR VALUE (32 HEX DIGITS)

```
┌──────────┐
│  429F... │
└──────────┘
```

CURRENT GENERATOR VALUE

```
┌──────────┐
│  42F9... │
└──────────┘
```
32 DIGITS

```
┌─────────────────────┐
│     SECONDARY       │
│  MODIFIER TABLE "A" │
│    FIXED (IN PROM)  │
└─────────────────────┘
```
10 VALUES, 32 DIGITS PER VALUE

```
┌─────────────────────┐
│     SECONDARY       │
│  MODIFIER TABLE "B" │
│    FIXED (IN PROM)  │
└─────────────────────┘
```
10 VALUES, 32 DIGITS PER VALUE

SECONDARY KEY TABLE:

| COLUMN → | A | B |
|---|---|---|
| ROW: | | |
| 0 | E943... | D756... |
| 1 | DF98... | C827... |
| 2 | B160... | 4E68... |
| 3 | FA07... | 5280... |
| 4 | CA3A... | 2803... |
| 5 | 0551... | 5E09... |
| 6 | 814E... | E83B... |
| 7 | 4D49... | D815... |
| 8 | 25E8... | 5FC3... |
| 9 | AB6A... | 20C0... |

32 DIGITS PER ENTRY (20 ENTRIES)

| DIGIT # | 1 2 | 3 4 5 6 7 | 8 |
|---|---|---|---|
| KEY COUNTER | 0 0 | 0 0 0 0 0 | 0 |
| | 2 DIGITS | 5 DIGITS | 1 DIGIT |

GENERATION OF SECONDARY COLUMNS USING LOADED VALUE

*FIGURE 10*

BASE GENERATOR VALUE (32 HEX DIGITS)

```
┌─────────────┐          ┌─────────────────────┐
│  C827...    │          │     SECONDARY       │
└─────────────┘          │  MODIFIER TABLE "A" │
                         │   FIXED (IN PROM)   │
CURRENT GENERATOR VALUE  └─────────────────────┘
┌─────────────┐          10 VALUES, 32 DIGITS PER VALUE
│   XXXX...   │          ┌─────────────────────┐
└─────────────┘          │     SECONDARY       │
32 DIGITS                │  MODIFIER TABLE "B" │
                         │   FIXED (IN PROM)   │
                         └─────────────────────┘
                         10 VALUES, 32 DIGITS PER VALUE
```

SECONDARY KEY TABLE:

| ROW | A | B |
|---|---|---|
| 0 | XXXX... | XXXX... |
| 1 | DF98... | XXXX... |
| 2 | B160... | 4E68... |
| 3 | FA07... | 5280... |
| 4 | CA3A... | 2803... |
| 5 | 0551... | 5E09... |
| 6 | 814E... | E83B... |
| 7 | 4D49... | D815... |
| 8 | 25E8... | 5FC3... |
| 9 | AB6A... | 20C0... |

32 DIGITS PER ENTRY (20 ENTRIES)

```
DIGIT #    1 2    3 4 5 6 7    8
         ┌─────┬───────────┬─────┐
KEY COUNTER │ 0 0 │ 0 0 0 0 0 │  0  │
         └─────┴───────────┴─────┘
         2 DIGITS  5 DIGITS  1 DIGIT
```

XXXX = CLEARED

REPLACEMENT OF BASE GENERATOR VALUE FROM SECONDARY TABLE

*FIGURE 11*

BASE GENERATOR VALUE (32 HEX DIGITS)

```
┌─────────────┐
│   4E68...   │
└─────────────┘
```

CURRENT GENERATOR VALUE

```
┌─────────────┐
│   C827...   │
└─────────────┘
```
32 DIGITS

```
┌──────────────────────┐
│      SECONDARY       │
│   MODIFIER TABLE "A" │
│     FIXED (IN PROM)  │
└──────────────────────┘
```
10 VALUES, 32 DIGITS PER VALUE

```
┌──────────────────────┐
│      SECONDARY       │
│   MODIFIER TABLE "B" │
│     FIXED (IN PROM)  │
└──────────────────────┘
```
10 VALUES, 32 DIGITS PER VALUE

SECONDARY KEY TABLE:

| COLUMN → | A | B |
|---|---|---|
| ROW: | | |
| 0 | XXXX... | XXXX... |
| 1 | DF98... | XXXX... |
| 2 | B160... | XXXX... |
| 3 | FA07... | 5280... |
| 4 | CA3A... | 2803... |
| 5 | 0551... | 5E09... |
| 6 | 814E... | E83B... |
| 7 | 4D49... | D815... |
| 8 | 25E8... | 5FC3... |
| 9 | AB6A... | 20C0... |

32 DIGITS PER ENTRY (20 ENTRIES)

```
DIGIT #   1 2   3 4 5 6 7   8
        ┌─────┬───────────┬───┐
KEY COUNTER │ 0 1 │ 0 0 0 0 0 │ 0 │
        └─────┴───────────┴───┘
0 1  1 0 0 0 0 0 1   0  1
                  2 DIGITS   5 DIGITS   1 DIGIT
```

XXXX = CLEARED

USE OF REPLACED BASE GENERATOR VALUE TO REGENERATE COLUMN 5 OF PRIMARY TABLE

*FIGURE 12*

IF KEY COUNTER BIT #1 (MOST SIGNIFICANT) IS NOT ZERO, GO TO

IF KEY COUNTER BIT #1 IS ZERO AND BIT #2 IS NOT ZERO, GO TO

IF KEY COUNTER BIT #1 AND BIT #2 ARE BOTH ZERO, GO TO

SECURITY MODULE DETERMINATION OF PIN PAD KEY
RE-GENERATING THE EXTERNALLY-LOADED BASE GENERATOR VALUE

PIN-PAD KEY DETERMINATION BY SECURITY MODULE
KEY COUNTER DIGIT #1 NOT ZERO

PIN-PAD KEY DETERMINATION BY SECURITY MODULE
KEY COUNTER DIGIT #1 AND DIGIT #2 BOTH ZERO

KEY MANAGEMENT SYSTEM FOR ON-LINE COMMUNICATION

INTRODUCTION

One of the primary functions performed by the encrypting PIN pad is the reversible encrypting of the PIN using D.E.S (the Data Encryption Standard) for transmission to a point of remote PIN validation. The encrypted PIN is transmitted from the PIN Pad to an EDP system which includes a Security Module. This physicallysecure module will decrypt the encrypted PIN and either validate it, or else re-encrypt the PIN for transmission to another EDP system.

Encrypting PIN Pads may be placed in relatively non secure locations, so that stealing such a unit would not be particularly difficult. Furthermore there could eventually be hundreds of thousands of these units interfacing with each Security Module. As a result, the encrypting PIN Pad should have the following characteristics:

1. The PIN Pad should contain no information about the cryptographic key used to encrypt any PIN which has ever been encrypted by this or by any other PIN Pad.
2. Neither the EDP system nor the Security Module connected to it must be required to store any information (such as cryptographic keys) on a per-PIN-Pad basis, although the Security Module must be easily able to determine the information necessary to decrypt any PIN as encrypted by any PIN Pad.

The purpose of the first characteristic is to prevent the following fraud scenario. An adversary taps the communications line from a PIN Pad and records a significant number of encrypted PINs. He then steals the PIN Pad and, perhaps very laboriously, defeats the physical security mechanisms to ascertain the cryptographic key(s) stored within the unit. He then uses this information to decrypt the encrypted PINs which he had previously recorded.

The purpose of the second characteristic is to minimize system compelxity, and eliminate the "key management" problems which often characterize cryptographic operations.

The above objects of the subject invention will be apparent from the following detailed description taken in conjunction with the drawings in which:

BRIEF DESCRIPTION OF THE DRAWINGS

FIG. 1 is a schematic diagram illustrating the cintebts of the PIN pad including storage for the primary key table, key counter, generator values, and modifier table.

FIG. 2 is a schematic diagram, similar to FIG. 1, illustrating the step of loading the base generator value and the step of initializing the key counter.

FIG. 3 is a schematic diagram similar to FIG. 2 illustrating the generation of the first column of primary encrypting keys.

FIG. 5 is a schematic diagram, similar to FIG. 4, illustrating the generation of the second column of primary, encrypting keys.

FIG. 6 is a schematic diagram, similar to FIG. 5, illustrating the generation of the third column of primary, encrypting keys.

FIG. 7 is a schematic diagram, similar to FIG. 6, illustrating the generation of the fourth and fifth columns of primary encrypting keys, with the fifth column being shown expanded to its normal, double length size.

FIG. 8 is a table illustrating the association between counter values and primary encryption keys.

FIG. 9 is a schematic diagram, similar to FIG. 7, illustrating the generation of a second set of primary keys for column 5 of the table.

FIG. 10 is a schematic diagram illustrating the secondary key table as well as secondary modifier value tables.

FIG. 11 is a schematic diagram similar to FIG. 10 illustrating the replacement of the base generator value from the secondary key table.

FIG. 12 is a schematic diagram, similar to FIG. 11, illustrating the incrementing of the two digit field in the key counter and the replacement of base generator value from the secondary key table.

FIGS. 13A through D are flow charts illustrating the derivation (by the security module at the central host) of the primary key used by the terminal to encrypt the transaction, wherein:

FIG. 13A illustrates the generation of the initial base generator value;

FIG. 13B illustrates the steps taken if the first digit in the key counter is not zero;

FIG. 13C illustrates the steps taken if the first digit in the key counter is zero but the second digit is not zero; and FIG. 13D illustrates the steps taken if both the first and second digits of the key counter are zero.

KEY MANAGEMENT

Figure 4:
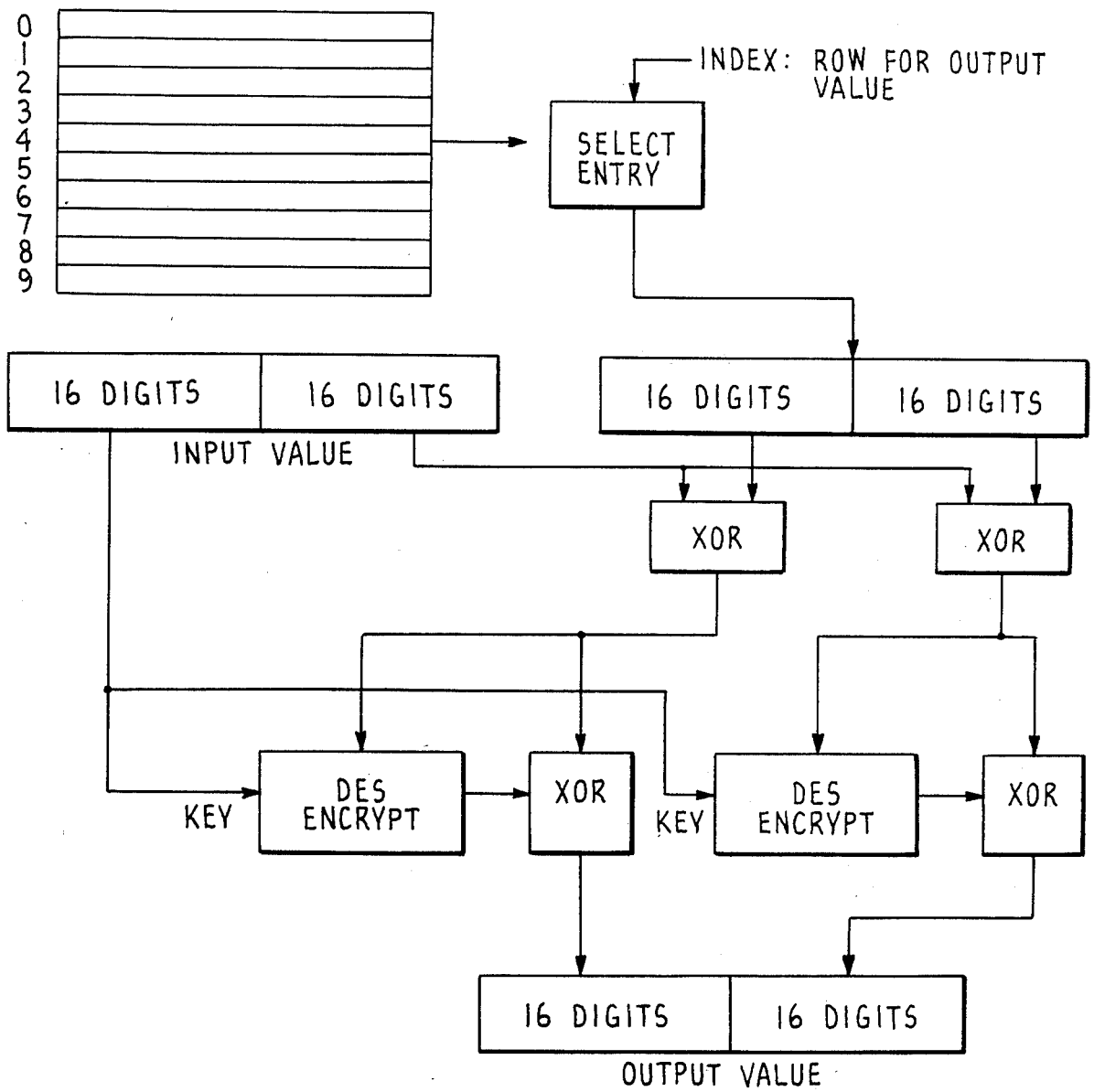
FIG. 4 is a flow chart, illustrating the specific steps taken to generate a primary encrypting key.

In order to achieve the two above-indicated objectives, the encrypting PIN Pad uses a relatively complex key management technique. FIG. 1 indicates the "primary" key storage within the PIN Pad. (There are also "secondary" key storage areas, which are discussed subsequently.) The primary key storage area consists mainly of a Primary Key Table. This table as illustrated in FIG. 1 is comprised of 50 entries of 32 hexadecimal digits each, as is structured as 5 columns with 10 rows per column. (This structure is quite arbitrary. There could have been any desired number of columns and of rows per column.) Each entry holds a 32 hexadecimal digit secret value, which we will denote as a "double length key", even though in most cases only 16 digits of the entry will be used as a cryptographic key.

The primary key storage areas also include two "generator values" of 32 hexadecimal digits each, and a Modifier Table which is fixed (unchanged), and which is the same for all PIN Pads. The contents of the Modifier Table are not secret. The contents of the Primary Key Table and the generator values are unique to each PIN Pad, are secret, and change with time.

Also shown in FIG. 1 is the key Counter. In the PIN Pad each PIN encryption operation uses a different key, and the Key Counter indicates how many keys have been used since the PIN Pad was placed in service. The contents of this counter are not secret.

PIN Pad Loading

Before the PIN Pad is placed in service, the Base Generator Value must be loaded with an initial secret double-length key, as indicated in FIG. 2. This key is generated by a Security Module. The module generates this value by encrypting the PIN Pad Identifier under a double-length master key (a key found only within Security Modules) using a triple-encryption procedure.

The PIN Pad Identifier is an eight decimal-digit number which uniquely identifies this particular PIN Pad. Thus no two PIN Pads will receive identical initial Base Generator Values.

Since the initial double-length key which is loaded into the PIN Pad must be generated by a Security Module, the PIN Pad must be physically connected to a Security Module, or to some other device which itself had previously been physically connected to a Security Module. This initial loading must be peformed under conditions of very high security, to ensure that no one has "tapped" the connection to the PIN Pad and thus ascertained the initial doublelength key.

At the time that the initial key is loaded into the PIN Pad, the Key Counter is set to all zeros, as also illustrated in FIG. 2.

Generation of Primary Key Table

Once the PIN Pad has been loaded with an initial double-length key, it immediately proceeds to generate the 50 values for the Primary Key Table. The contents of the Base Generator Value are moved into the Current Generator Value, and the Base Generator Value then receives new contents, as discussed subsequently. In the example shown in FIG. 2 and FIG. 3, the 32 digit initial contents of the Base Generator Value began with the digits "42F9". This value is thus transferred into the Current Generator Value, and used to generate column 1 of the Primary Key Table.

The actual generation process uses the fixed Modifier Table, and is illustrated in FIG. 4. The "42F9 . . . " becomes the Input Value in this figure. Initially the Index is zero, selecting entry #0 in the Modifier Table. The first 16 hex digits of this modifier value are exclusive-ored with the second 16 hex digits of the Input Value. The result is then DES encrypted, using the first 16 hex digits of the Input Value as a key. The result of the encryption process is then exclusive-ored wih the DES input, and serves as the first 16 hex digits of the Output Value. This process is then repeated using the second 16 hex digits of the modifier value, to produce the second 16 hex digits of the Output Value. The resulting 32 hex digit Output Value is then stored in row 0 column 1 of the Primary Key Table.

The above-described process is then repeated with an Index of one, thus utilizing entry #1 in the Modifier Table. The resulting output value is then stored in row 1 column 1 of the Primary Key Table. This process is then repeated with Index values of 2 through 9 to generate the output values for rows 2 through 9 of column 1. Note that the same input value, namely "42F9 . . . ", is used to generate all ten output values. However all ten output values are unique, and in fact all twenty half-length (16 hex digit) output results are unique, since no two 16-hex-digit portions of the Modifier Table are the same.

After all ten entries in column 1 of the Primary Key Table have been generated, the ten entries in column 2 must be generated. To accomplish this, the first entry (row 0) of column 1 is used, as illustrated in FIG. 5. This entry, "3B92 . . . " in the example of FIGS. 3 and 5, is transferred from row 0 column 1 to become the new Current Generator Value. Row 0 column 1 is then cleared. Ten Output Values are then generated by the technique of FIG. 4, using the indicies 0 through 9, just as was done to generate the 10 values for column 1. These 10 values are placed in rows 0 through 9 of column 2.

To generate the values for column 3 (see FIG. 6) the first entry (row 0) in column 2 is used, and row 0 of column 2 is then cleared. This procedure continues, until all rows of all five column have been generated. FIG. 7 illustrates the generation of column 5 using the first entry in column 4.

Note that FIG. 7 shows column 5 expanded, giving sample values for the first through the fourth hex digits, and also for the 17th through the 20th hex digits. This is to emphasize the fact that each entry contains 32 hex digits, to be considered as two values of 16 hex digits each. Each entry in column 5 will provide two 16 digit cryptographic keys for PIN encryption.

Key Selection for PIN encryption

Having generated all required values for the Primary Key Table, the encrypting PIN Pad is now ready for operation. The first key to be used comes from the left 16 hex digits in row 0 column 5. When this key, or any key, has been used, it is immediately erased from the Primary Key Table. Associated with this first key is a Key Counter value of all zeros, as illustrated in FIG. 8. The second key to be used comes from the right 16 hex digits in row 0 column 5. Associated with this is a Key Counter value of all zeros except for Digit #8, which is 1. The third key comes from the left 16 hex digits of row 1, and the associated Key Counter value has zeros in all positions except for a "1" in Digit #7. Note from FIG. 8 that Digit #8 of the Key Counter is simply a "left-/right" indicator, and has only the values "0" (for left) and "1" (for right). All other digits of the Key Counter can have any value in the range "0" through "9".

As is apparent from FIG. 8, column 5 provides 20 cryptographic keys for PIN encryption, two keys per row for 10 rows. Note that Digit #7 of the Key Counter indicates the column 5 row from which the key in question was obtained.

Generation of New PIN-Encryption Keys

When all 20 keys from column 5 have been used (and erased), it is necessary to generate a new set of values for this column. To accomplish this, the first un-erased entry in column 4 is used, as illustrated in FIG. 9. In the example presented in the figures, this entry comes from row 1 and has the value "1642 . . . ". This value is moved into the Current Key Generator Value, is erased from the Primary Key Table, and then is used to generate a new set of 10 values (20 keys) for column 5. Note from FIG. 8 that Digit #6 of the Key Counter indicates the column 4 row used to generate the column 5 key used for the current PIN encryption.

After 200 PIN encryptions, a new column 4 value will be required, but all 10 values in column 4 will have been erased. Thus a whole new set of column 4 values must be generated. These values are generated using the first (top-most) un-erased entry in column 3, which entry is then erased. When all entries in column 3 have been erased and a new column 3 value is needed (after 2000 PIN encryptions), a whole set of ten column 3 values is generated using the first un-erased column 2 value. In a similar manner new column 2 values are generated when required from the first un-erased column 1 value. Thus the five columns of the Primary Key Table are capable of providing 200,000 unique PIN-encrypting keys from column 5. When column 1 needs new values (after 200,000 PIN encryptions), a subsequently-discussed procedure is utilized, extending the life of the PIN Pad to 20 million unique PIN-encrypting keys.

It should be noted that each digit of the five-digit field (Digits #3 through Digit #7) of the Key Counter corresponds to one column in the Primary Key Table. Each such Key Counter digit indicates the entry (the row) from that column which was used to generate the column immediately to the right.

Use of the Secondary Key Table

The Secondary Key Table provides up to 100 replacement values for the Base Generator Value, and thus extends the useful life of the PIN Pad to 20 million PIN encryptions. This table consists of two columns, "A" and "B", each column (like those of the Primary Key Table) consisting of 10 entries of 32 hex digits each.

Both columns of the Secondary Key Table are initially generated from the initially loaded Base Generator Value, "429F . . . " in the examples. This initial generation takes place immediately after the PIN Pad has been externally loaded (FIG. 2). As indicated in FIG. 10, the Base Generator Value becomes the Current Generator Value, and is used as the Input Value (FIG. 4) to generate both column "A" and column "B" of the Secondary Key Table. The method of generating the values of these two columns is identical to that indicated in FIG. 4 and described above, except that the Modifier Table of FIGS. 1-3, 5-7, and 9 is not used. Rather, the Modifier Values as shown in FIG. 4 come, in this case, from Secondary Modifier Table "A" and Secondary Modifier Table "B" in FIG. 10. Table "A" is used to generate the ten values for column "A", and Table "B" is used to generate those for column "B". Since no 16-hex-digit portion of any entry in any modifier table is identical to that of any other entry, the values generated for column "A" and "B" will all be unique, and different from those of column 1 in the Primary Key Table, even though the same Current Generator Value was used for all three columns.

Once columns "A" and "B" have been initially generated, entry #0 in each column is erased (it would never be used), and entry #1 from column "B" becomes the replacement Base Generator Value. This is illustrated in FIG. 11. Note that the Current Generator Value is erased as soon as column 1 of the Primary Key Table has been generated, so there is no longer any record in the PIN Pad of the externally-loaded Base Generator Value.

After 200,000 PIN encryptions, each with a unique key, the contents of the Primary Key Table will have been exhausted, and the Key Counter's five-digit field (Digit #3 through Digit #7) will have cycled back to 00000. This causes the Key Counter's two-digit field (Digit #1 and Digit #2) to be incremented, and causes an entirely new Primary Key Table to be generated, this time using the replacement Base Generator Value from the Secondary Key Table as shown in FIG. 12. This re-generation of the Primary Key Table is identical to the initial generation of this table as previously described, except for the use of the different Base Generator Value. Then the Base Generator Value is replaced with the first un-erased entry in column "B" of the Secondary Key Table, leaving no record in the PIN Pad of this just-used Base Generator Value.

This process continues each time the Primary Key Table becomes exhausted. As it does, the least significant digit of the Key Counter's two-digit field is incremented, and the next column "B" entry is used and then erased.

Eventually all the entires in column "B" will have been used (after 2 million PIN encryptions). It is now necessary to generate a new set of entries for column "B". To accomplish this, the first un-erased entry in column "A" is used and then erased. This generation uses the technique of FIG. 4, obtaining its modifier values from Secondary Modifier Table "B". In this way the PIN Pad can provide 20 million unique keys for PIN encryption.

It should be noted that the Key Counter's two-digit field indicates the entry from column "A" used to generate column "B" and the entry from column "B" used to re-generate the Primary Key Table, except that the value "00" indicates that the Primary Key Table was generated from the initially-loaded Base Generator Value, and a most significant digit of "0" indicates that column "B" was generated from this initially-loaded Base Generator Value.

It is currently presumed that the 20 million unique PIN encryption keys which the PIN Pad provides are much more than sufficient for any application. However if they are not, it would be relatively easy to extend the useful life of the PIN Pad to as many PIN encryptions as desired. One obvious way of achieving this would be to provide additional columns in the Secondary Key Table (or in the Primary Key Table). Each such additional column would increase the number of keys by a factor of 10. However another technique could be used which would not require any significant additional storage within the unit. Under this technique, entry #0 of column "A" would be retained, rather than erased. (Recall that in the method described above this entry would never be used, and thus was initially cleared.) This entry would serve as the Base Generator Value in the event that all entries from column "A" had been used and still more keys were needed. It would serve just as did the externally-loaded Base Generator Value, as previously discussed, and would result in the generation of new values for all entries in both the Primary and the Secondary Key Tables, including a new value for entry #0 of column A. An "Overflow Counter" would be appended to the left of the Key Counter. This "Overflow Counter" would initially be zero, an would be incremented each time entry #0 of column "A" served as the Base Generator Value to regenerate the Primary and Secondary Key Tables. Thus the number of unique keys which the PIN Pad could provide would be limited only by the size of the "Overflow Counter".

Determination of the PIN Pad Key by The Security Module

When an encrypted PIN from the PIN pad reaches a security module, this module must be able to determine the key used in the encryption process. It is able to do this given only (1) the PIN pad's 8-digit identifier, and (2) the PIN pad 8-digit key counter. This information is included in the transaction as transmitted from the PIN pad, so no data base information is required in the key determination process.

The procedure used by the security module to determine the PIN pad's current key is illustrated in FIG. 13. The first step is to determine the base generator value which was originally loaded into the PIN pad from some external source. This is simply a multiple encryption process, using master keys stored within the module to encrypt the PIN pad identifier, as shown in FIG. 13A. The procedure to then be followed depends upon the digit No. 1 and digit No. 2 of the key counter. If digit No. 1 is not 0, this indicates that column "B" of the PIN pad secondary key table has been regenerated using a value from column "A", and the procedure to be followed is that of FIG. 13B. If digit No. 1 is 0 and digit No. 2 is not 0 this indicates that the entire primary key table is regenerated using column "B" of the secondary key table, and the procedure to be followed is that of FIG. 13C. If both digit No. 1 and digit No. 2 are both 0 the primary key table of the PIN pad is still based on the externally loaded base generator value and the procedure to be followed is that of FIG. 13D.

Figures 13A, 13B, 13C, 13D:
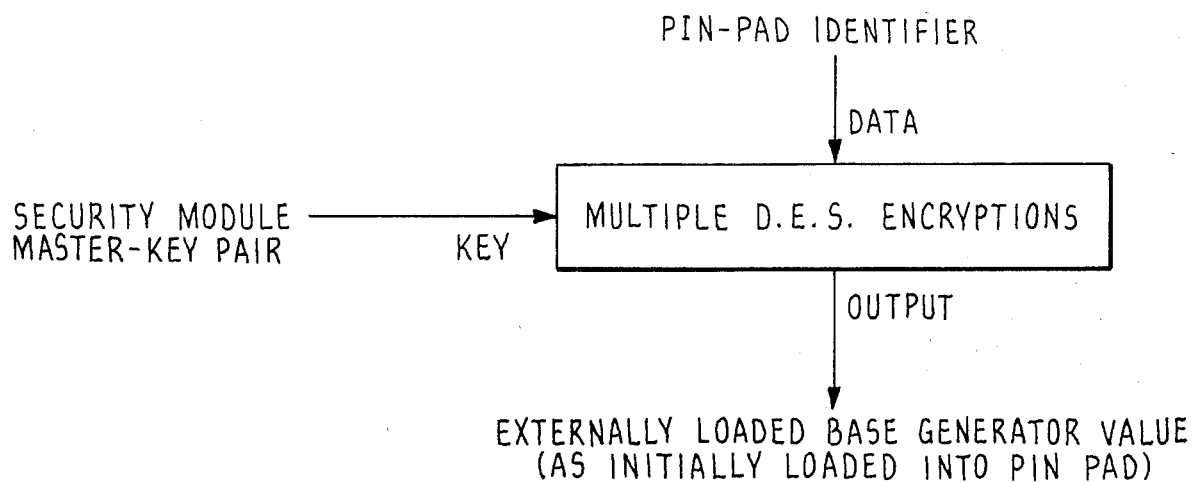
Figure 13B:
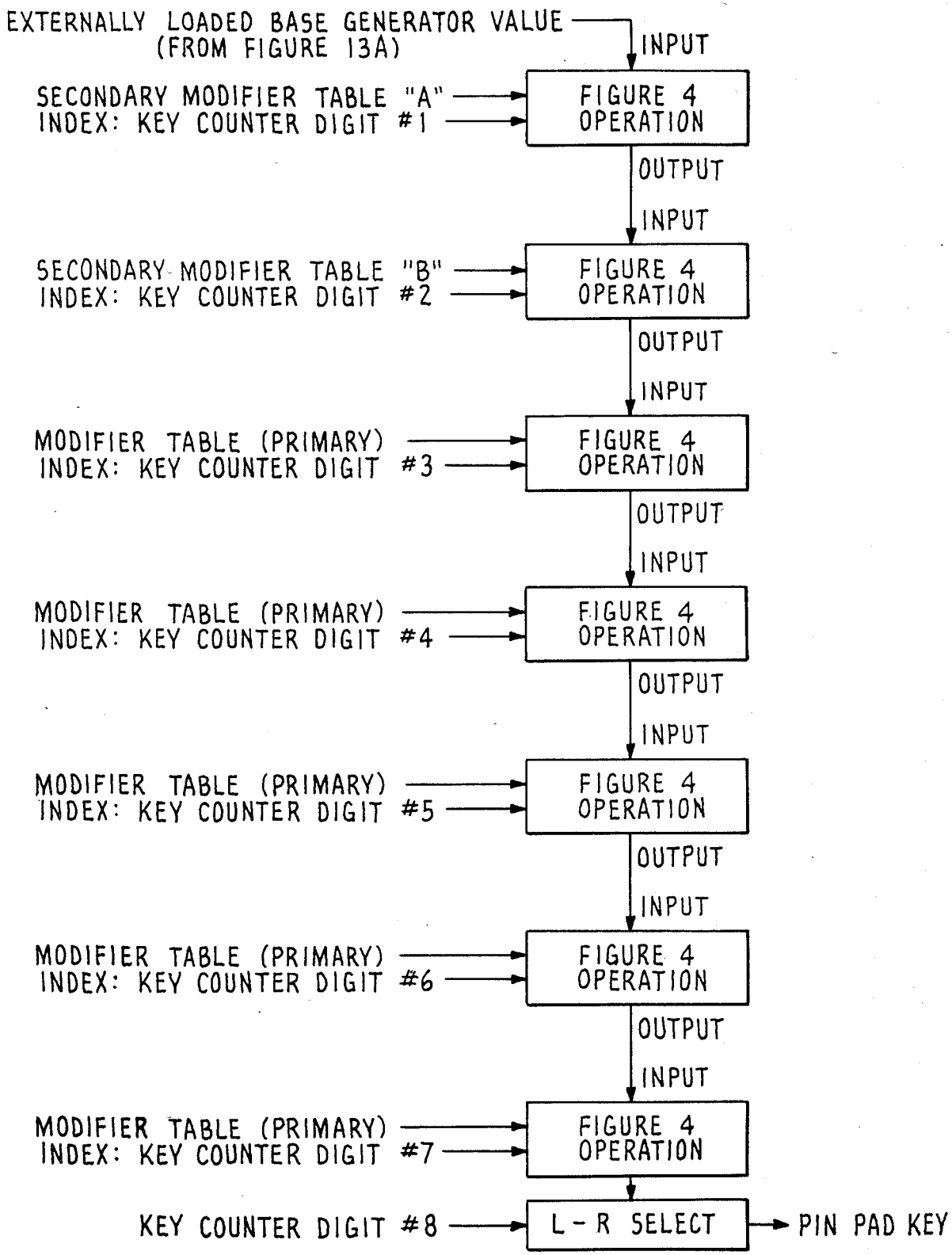
Figure 13C:
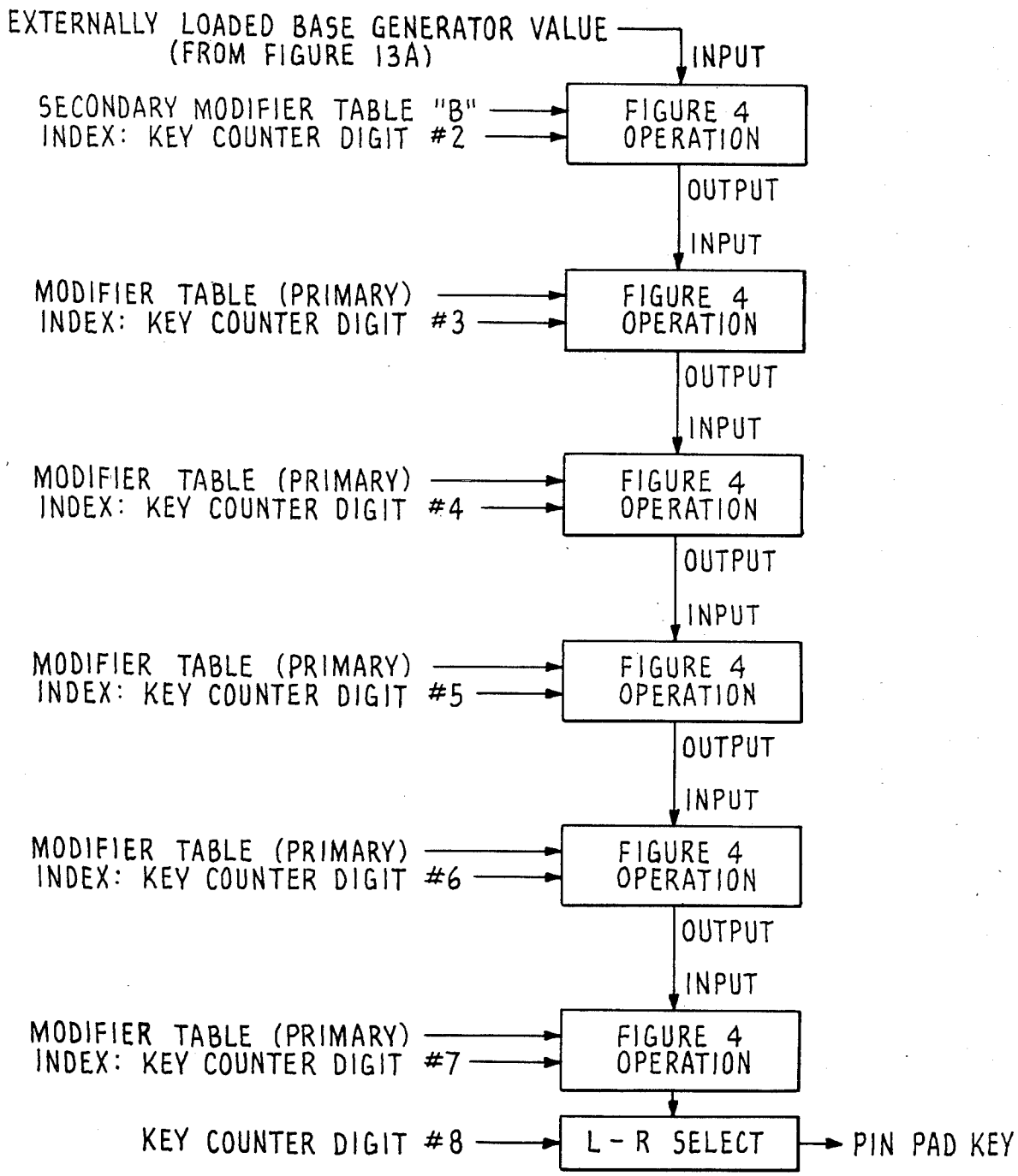
Figure 13D:
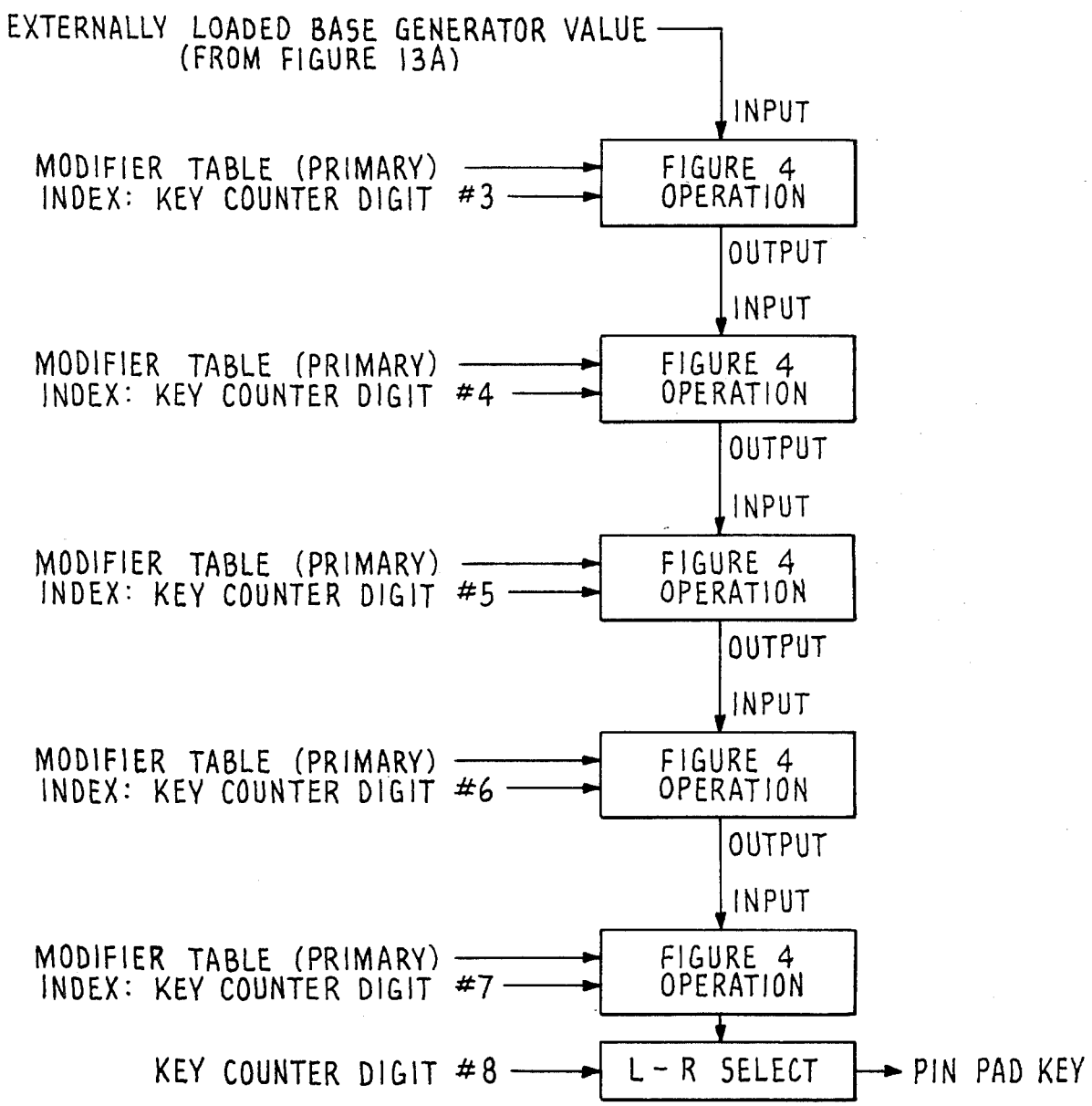

Considering FIG. 13D the process is to determine the column 1 value which was used to generate the column 2 value which was used to generate the column 3 value which was used to generate the column 4 value which was used to generate the column 5 value from which the PIN encryption key was taken. Each step of this process used the technique of FIG. 4 with the (primary) modifier table entry corresponding to the appropriate digits in the key counter. If the secondary key table is used in the generation process, an analogous procedure is followed, as illustrated in FIG. 13B and FIG. 13C.

The process of FIG. 13A ( of determining the externally loaded base generator value) requires 3 DES algorithm cycles. Each "FIG. 4 operation" of FIG. 13B through 13D requires two algorithm cycles. Thus, the security module requires 17 algorithm cycles to determine the current PIN pad's PIN encryption key, if the PIN pad has been used more than two million times; 15 algorithm cycles if used less than two million times; and 13 algorithm cycles if used less than 200,000 times.

If the above mentioned "overflow counter" is used, so as to extend the PIN pad life beyond 20,000,000 encryptions, the security module must take account of this in determining the PIN encryption key. If this counter contains a nonzero value, the externally loaded base generator value from FIG. 13A is used as the input to a "FIG. 4 process" which uses entry number 0 from the secondary modifier table "A". The resulting output becomes the new base generator value, the "overflow counter" is decremented, and if not then zero, the process is repeated. If the base generator value which results when the overflow counter reaches zero is that used in the process of FIG. 13B. Note that this procedure would add two algorithm cycles every 20,000,000 PIN encryption keys after the first 20,000,000.

Features of the Key Management Technique

This key management technique achieves the objectives which were stated initially. First, the PIN pad never contains any information about any key which has ever been used to encrypt any PIN. As soon as a PIN encrypting key has been used, it is immediately erased. Furthermore, any table entry used in the generation of any key is erased as soon as it is used, which is before the key itself is used. The table entries which are in the unit at any given time provide no information about any previous table entries. Thus, even if someone should steal a PIN pad and manage to defeat the physical security mechanisms to determine all the data contained within the unit, he would not ascertain anything about any key which had ever been used.

The second initially stated objective is achieved because the EDP system security module can easily determine the key used to encrypt the PIN in the current transaction simply from information included in the transaction. This will usually require a few more than 13 DES algorithm cycles and will never require more than 17 algorithm cycles (unless any PIN pad is used more than 20,000,000 times, and the previously suggested overflow counter is implemented). The only storage which is required in the EDP system is a "negative file" of the 8-digit identifiers of those PIN pads which are missing or stolen. Whenever a transaction derives from a PIN pad its identifier must be checked against this negative file, as no transactions will be allowed from missing or stolen PIN pads. (It is possible that someone may have comprised such a PIN pad and determined information which would enable him to determine future keys). This is a very small file compared to the total number of PIN pads.

Note that any given PIN pad may communicate with any number of EDP systems, each with its own security modules. The only requirements are that all of the security modules must contain the same master key used to determine the manually loaded base generator value, and all of the EDP systems must contain the above indicated "negative file".

Another feature of this key management system is that it is never necessary (except for the loading of the initial base generator value) to transmit any key related information from the security module or EDP system to the PIN pad. This reduces system overhead and complexity. It also allows "one way" PIN pads which transmit to the associated terminal but do not receive from it. A number of terminals in service today have the ability to receive data from a PIN pad, but not to transmit data to it. This key management technique can be used for such PIN pads.

An additional feature of this key management approach is provision for the eventuality, that exhaustive "trial and error determination" of DES keys may some day be possible. The only technique which can be used to defeat DES is an exhaustive attack in which an adversary knows both the DES input and the DES output, and tries all possible keys until he finds the one which produces the known output from the known input. At one microsecond per trial this approach would take on the average more than 1,000 years, so it is not feasible today. However, at some future time, with the advance in electronic technology, this may become feasible.

With this key management scheme, the adversary with the ability to determine DES keys by trial and error would be able, using a transaction based on his own PIN (or a PIN already known to him), do determine the key used to encrypt this PIN. However, since this key is not used to encrypt any other PIN, this information of itself would be of no use to him. If a different method of key generation had been used within the PIN pad, he might have been able to perform a second trial and error operation to determine the key used to generate the PIN encrypting key, and a third trial and error operation to determine the key used to generate this key, etc. In this way, he might have been able to then work forward and determine other PIN encrypting keys. However, this method of key generation precludes this. Note from FIG. 4 that the DES input is the function of a secret quantity, the right most 16 digits of the input value (the current generator value), hence will not be known to the adversary. Thus, the adversary knows neither the DES key nor the DES input hence cannot perform exhaustive trial and error key determination. He would have to determine concurrently the DES input and the DES key, but this is far beyond the capabilities of any electronic equipment even of the distant future. Note in FIG. 4 that the DES input is exclusive ORed with the DES output to provide the final output. This makes the encryption process nonreversible, and prevents the following attack on the part of an adversary who can try all possible keys. He determines by two trial and error operations the keys used to encrypt two consecutive PINS, such that he has a 32-digit output value from FIG. 4. With each possible key he decrypts each 16-digit halves then exclusive ORs each result with the appropriate modifier value (these values are assumed to be nonsecret), and then checks to see if the results are the same. If they are, the result is the right most 16 digits of the input value and the key which he tried at this point is the left most 16 digits of the input value. Thus, by a double trial and error procedure he has determined the input value from the output value, a procedure he repeats for earlier columns in the primary key table.

Not only does this key management technique prevent an adversary with a trial and error capability from learning keys which had been used to encrypt PINs given the PIN pad output for a known PIN, but he is even prevented from accomplishing this sould he steal the unit, defeat the security measures, and determine all of the data stored within the key tables at that point. Again, the FIG. 4 technique makes it impossible for him to determine any previous entries from any key table.

In summary, this key management approach provides very high security with virtually no system complexity. It is well suited for use in PIN pads which may be installed in nonsecure locations. Even if the unit should be stolen and compromised, no information about past PIN encryptions can be ascertained. The "negative file" of missing or stolen PIN pads protects against a compromised unit being placed back in service and used for future PIN encryptions. The approach is relatively complex within the PIN pad itself, but this complexity simply takes the form of a microcomputer program and about 1200 bytes of storage, of little cost significance for units built in quantity. This complexity within the PIN pad results in very great simplicity everywhere else in the system, there being no files of encrypted keys and no "downline loading" of keys on the part of the EDP facitlty. The EDP facility needs nothing more than the previously mentioned "negative file" and the proper set of master keys in its security module. In addition, this key management approach should have a very long useful life, because its security will not be jeopardized even if exhaustive trial and error determinations of DES keys becomes feasible.

While the subject invention has been described with reference to a preferred embodiment, various other modifications could be made therein, by one skilled in the art, without varying from the scope or spirit of the appended claims.

What is claimed is:

1. A transaction terminal having a cryptographic key generator suitable for on-line encrypted communication between the terminal and a central host comprising:
    means for encrypting data;
    means for receiving and storing a base generator value;
    storage means containing a plurality of modifier values;
    means for generating a matrix table of encryption keys wherein the keys in a first column in the matrix table are generated by encrypting said modifier values using the base generator value as the encrypting key and wherein the keys of the second and each successive column in the table are generated by encrypting the modifier values with the first unused key in the previous column, and wherein any key that is used to generate a column of keys is immediately erased; and
    counter means, having at least as many digits as columns in said matrix, with the location of the digits in the counter means corresponding to a particular column in the matrix and with the value of each digit corresponding to a particular row in the matrix, whereby transmission of the value in the counter means to the host during a transaction will enable the host to determine the key used to encrypt the communication.

2. A terminal as recited in claim 1 wherein during a transaction, said encrypting means selects a key from the first unused row in the last column of the matrix to encrypt the communication and erases that key when the transaction is complete.

3. A terminal as recited in claim 2 arranged such that when a column of keys has been erased, the generator means generates a new column by encrypting the modifier values with the first unused key in the previous row and thereafter erases that key.

4. A terminal as recited in claim 1 including a means for replacing the gas generator value when all the keys in said matrix have been erased, said means including a table of secondary modifier values and wherein said generation means functions to generate a secondary key table by encrypting the secondary modifier values in said table using the base generator value, with said keys in said secondary key table being available to replace the base generator value.

5. A terminal as recited in claim 4 wherein said counter includes an overflow digit, with the value of said overflow digit corresponding to the key from the secondary key table that was utilized to generate the matrix.

6. A terminal as recited in claim 1 wherein the counter is decimal based.

7. A secure communication system including a transaction terminal and a central host, with said system comprising:
    a terminal including;
    means for encrypting data;
    means for receiving and storing a base generator value;
    storage means containing a plurality of modifier values;
    means for generating a matrix table of encryption keys wherein the keys in a first column in the matrix table are generated by encrypting said modifier values using the base generator value as the encrypting key and wherein the keys of the second and each successive column in the table are generated by encrypting the modifier values with the first unused key in the previous column and wherein any key that is used to generate a column of keys is immediately erased; and
    counter means, having at least as many digits as columns in said matrix, with the location of the digits in the counter means corresponding to a particular column in the matrix and with the value of each digit corresponding to a particular row in the matrix;

means for transmitting to the central host the value of the counter means along with transaction data encrypted using an encryption key from the matrix; and means at the central host for deriving the encryption key utilizing the counter value received from the terminal permitting evaluation of the encrypted transaction information.

8. A communication system as recited in claim 7, where the means for deriving the key at the central host encrypts the modifier value associated with the most significant digit of the counter using the base generator value and thereafter, the modifier values associated with each of the successive digits of the counter are encrypted utilizing the result from the previous encryption step as the encryption key, with the final result being representative of the key used to encrypt the transaction data.

9. A communication system as recited in claim 7 wherein during a transaction, said encrypting means selects a key from the first unused row in the last column of the matrix to encrypt the communication and erases that key when the transaction is complete.

10. A communication system as recited in claim 9 arranged such that when a column of keys has been erased, the generator means generates a new column by encrypting the modifier values with the first unused key in the previous row and thereafter erases that key.

11. A communication system as recited in claim 7 including a means for replacing the base generator value when all the keys in said matrix have been erased, said means including a table of secondary modifier values and wherein said generation means functions to generate a secondary key table by encrypting the secondary modifier values in said table using the base generator value, with said keys in said secondary key table being available to replace the base generator value.

12. A communication system as recited in claim 11 wherein said counter includes an overflow digit, with the value of said overflow digit corresponding to the key from the secondary key table that was utilized to generate the matrix.

13. A communication system as recited in claim 7 wherein the counter is decimal based.

* * * * *